Figure 1:
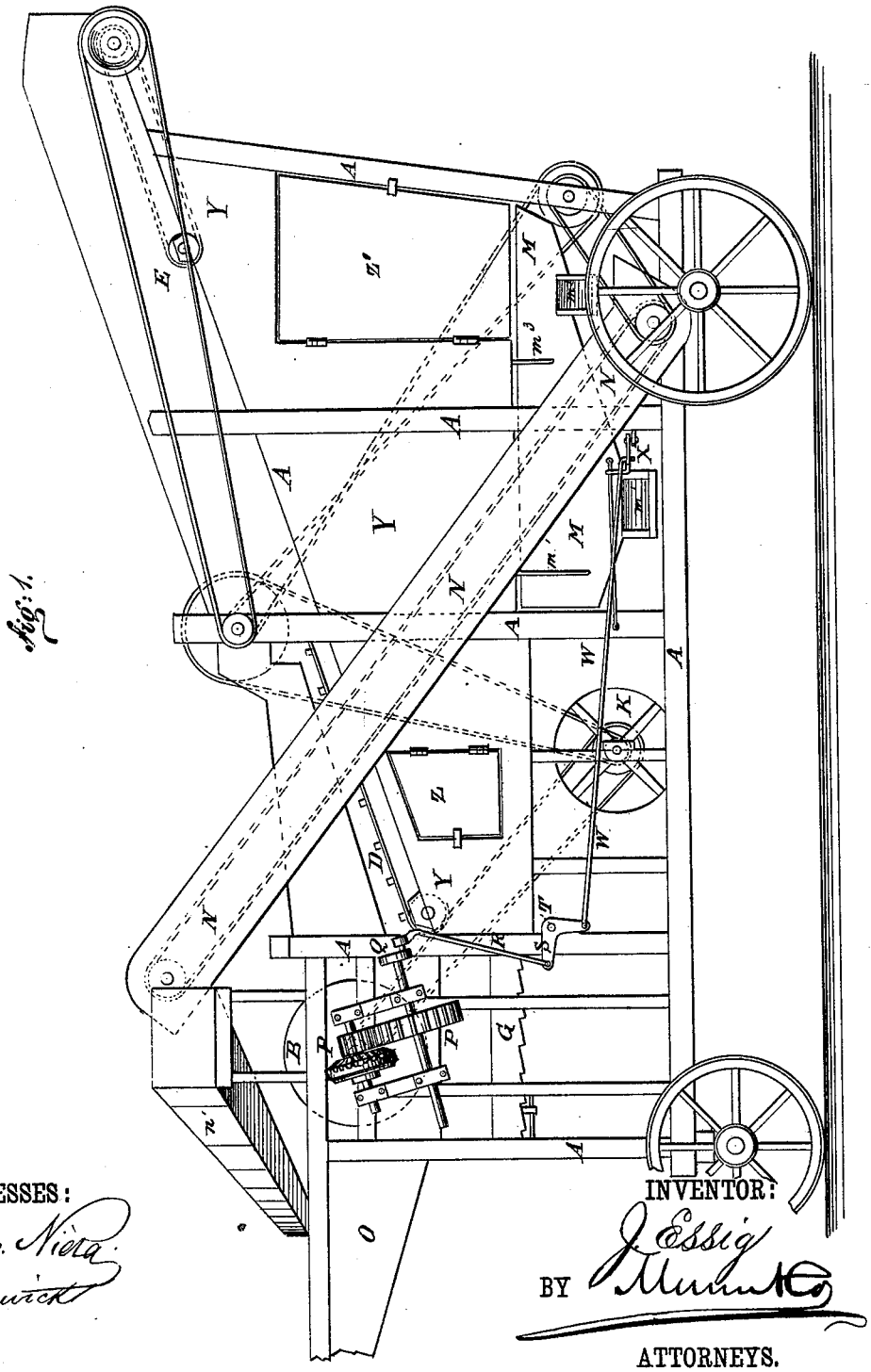

2 Sheets—Sheet 1.

J. ESSIG.
Grain-Separator.

No. 208,726. Patented Oct. 8, 1878.

WITNESSES:

INVENTOR:
J. Essig
BY
ATTORNEYS.

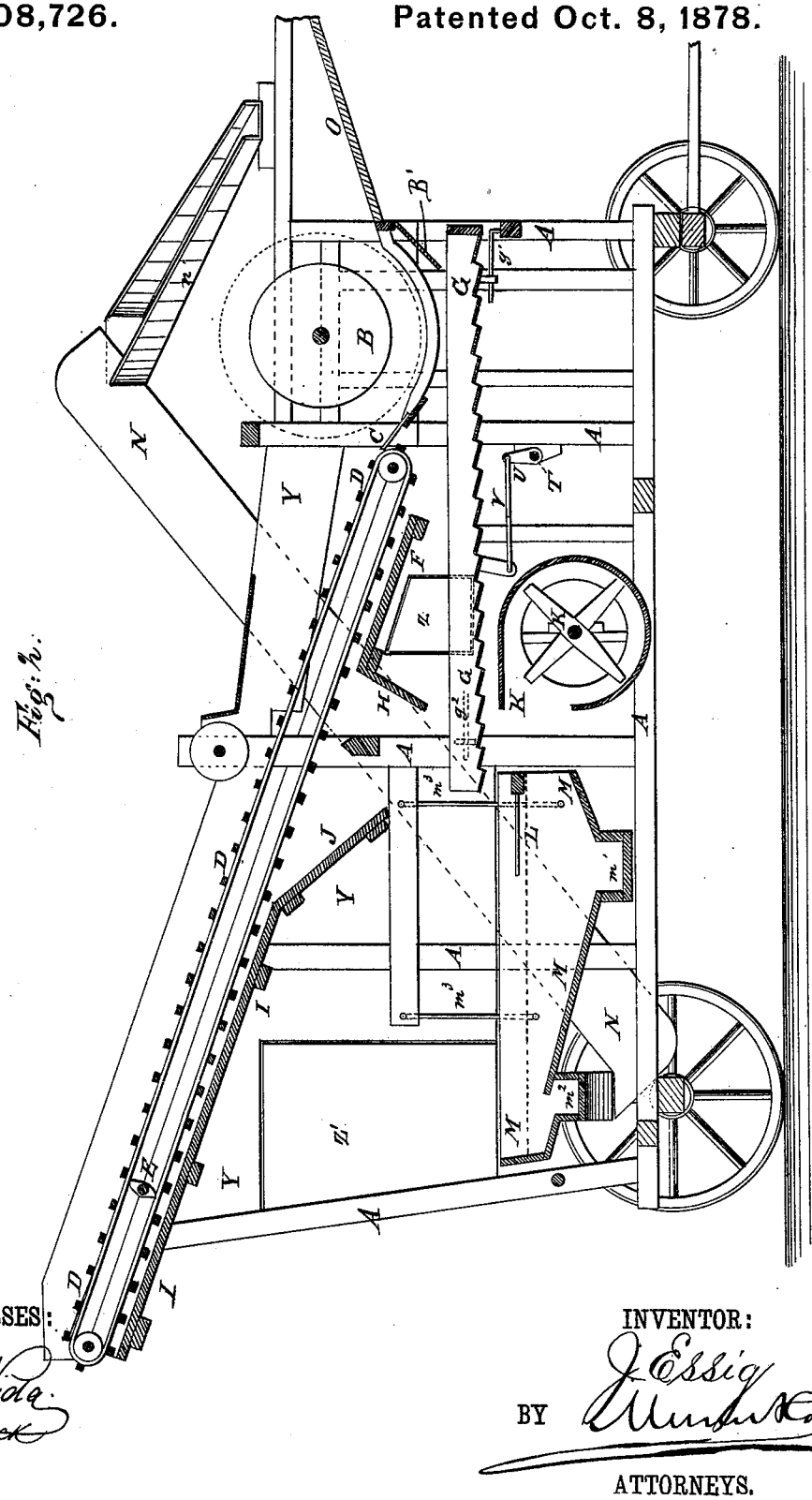

UNITED STATES PATENT OFFICE.

JACOB ESSIG, OF MILFORD, MINNESOTA.

IMPROVEMENT IN GRAIN-SEPARATORS.

Specification forming part of Letters Patent No. 208,726, dated October 8, 1878; application filed March 6, 1878.

*To all whom it may concern:*

Be it known that I, JACOB ESSIG, of Milford, in the county of Brown and State of Minnesota, have invented a new and useful Improvement in Combined Thrasher and Grain-Separator, of which the following is a specification:

Figure 1, Sheet 1, is a side view of my improved machine. Fig. 2, Sheet 2, is a vertical longitudinal section of the same.

Similar letters of reference indicate corresponding parts.

The object of this invention is to furnish an improved machine for thrashing the grain and cleaning it at one operation, and which shall be simple in construction, convenient in use, and reliable in operation.

The invention will first be described in connection with the drawing, and then pointed out in the claim.

A represents the frame of the machine, which is designed to be provided with wheels for convenience in moving it from place to place. In the upper rear part of the frame A is placed the thrashing-cylinder B, which is provided with a concave in the usual way, and the journals of which revolve in bearings attached to the frame A. A platform or chute, B', is arranged below the concave, at the front thereof, for the purpose of guiding the grain that falls through the thrasher-concave to the shaker.

To the forward edge of the concave of the thrasher is attached a series of guide-fingers, C, to guide the straw to the carrier D, by which it is carried forward and discharged from the machine. The carrier D may be made continuous or in two parts, as may be desired, and is agitated to shake the kernels of grain from the straw by a beater, E, pivoted to the frame of the machine in such a position as to operate upon the upper forward part of the said carrier. Beneath the rear part of the carrier D is placed an inclined apron, F, to guide the kernels of grain that may fall from the straw to the middle part of the shaker G. To the forward end of the apron F is attached an inclined apron, H, to guide the kernels of grain that may fall upon it to the forward part of the shaker G. Beneath the forward part of the carrier D is placed an inclined apron, I, which has an inclined apron, J, attached to its rear end, to guide the kernels that fall upon them to the forward part of the shaker G.

The shaker G, which is placed beneath the thrasher B and the rear part of the carrier D, moves back and forth upon guide-rods $g^1$ $g^2$, attached to the frame A, and its bottom is formed of slats so arranged that the forward edge of each rear slat may be just above the rear edge of the preceding slat, as shown in Fig. 2. Beneath the forward part of the shaker G is placed a fan-blower, K, the case of which is so formed as to direct the blast against the grain as it falls from the forward end of the shaker G.

As the grain drops from the forward end of the shaker G it falls upon the series of fingers L, attached to the shoe M, by which it is detained and separated, so that the blast from the fan-blower K may operate fully upon all parts of the falling mass, and may blow off all the chaff. The clean grain falls into the rear part of the shoe M, passes out through the spout $m^1$, and is put into bags or otherwise taken care of. All unthrashed and partially-thrashed heads that are too heavy to be carried over the end board of the shoe by the blast fall in the forward part of the shoe M and pass out through the spout $m^2$. The unthrashed and partially-thrashed heads pass from the spout $m^2$ to the elevator N, attached to the side of the machine, by which they are carried up, and are discharged through the spout $n'$ to the feed-apron O, to again pass through the thrasher.

Power is applied to the journal of the thrashing-cylinder, and the carrier, the beater, the fan-blower, and the elevator are driven from said journal by a series of belts. With the other journal of the thrashing-cylinder is connected a train of gear-wheels, P, the journals of which revolve in bearings attached to the frame A, and to the journal of the last wheel of said train is attached a crank-wheel, Q. To the crank-pin of the wheel Q is pivoted the upper end of a connecting-rod, R, the lower end of which is pivoted to the end of the elbow-lever S. The elbow-lever S is attached at its angle to the end of a shaft, T, which rocks in bearings attached to the frame A, and to which are rigidly attached two arms, U. To the ends of the arms U are pivoted the rear ends of the rods V, the forward ends of which are pivoted to the side bars of the shaker G, so that the said shaker may be vibrated by the movement of the thrashing-cylinder. To the other arm of the elbow-lever S is pivoted the rear end of a connecting-rod, W, the forward end of which is pivoted to an arm of the elbow-lever X. The elbow-lever X is pivoted at its angle to the frame A, and the end of its other arm is connected with the shoe M, which is suspended from the frame A by the rods $m^3$, so that the said shoe may be agitated by the movement of the thrashing-cylinder B. The sides of the frame A are inclosed with a casing, Y, in which are formed small doors Z Z', to give access to the interior of the machine when required.

The door Z is arranged below the inclined apron F, and is used for the purpose of inspecting the condition of the sieves or screens. It will be seen that by this arrangement the observer is enabled to place his head inside the apparatus without being compelled to look against the blast or wind of the fan and having the dust or chaff blown into his face. The aforesaid apron F will also prevent the grain from falling on the observer's head.

Having thus described my invention, I claim as new and desire to secure by Letters Patent—

In a thrasher and separator, the door Z, inclined apron F, and board H, arranged with respect to the fan K, carrier D, and cleaning-shoe M, as shown and described, so that the sieves can be inspected without encountering the blast, the dust, or the chaff, and the falling grain.

JACOB ESSIG.

Witnesses:
HENRY MOLL,
JOHN ESSIG.